(12) United States Patent
Gao et al.

(10) Patent No.: US 9,584,031 B2
(45) Date of Patent: *Feb. 28, 2017

(54) POWER SUPPLY WITH CONFIGURABLE CONTROLLER WITH COMBINATION INPUT/OUTPUT LINE

(71) Applicant: Dialog Semiconductor Inc., Campbell, CA (US)

(72) Inventors: Xiaolin Gao, Santa Clara, CA (US); Qiu Sha, Cupertino, CA (US); Fuqiang Shi, Los Gatos, CA (US); Yong Li, San Jose, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/810,650

(22) Filed: Jul. 28, 2015

(65) Prior Publication Data
US 2015/0333638 A1    Nov. 19, 2015

Related U.S. Application Data

(63) Continuation of application No. 13/937,044, filed on Jul. 8, 2013, now Pat. No. 9,124,185.

(60) Provisional application No. 61/670,742, filed on Jul. 12, 2012.

(51) Int. Cl.
*H02M 3/335* (2006.01)

(52) U.S. Cl.
CPC ............... *H02M 3/33507* (2013.01)

(58) Field of Classification Search
CPC ...... H02M 1/08; H02M 1/36; H02M 3/33507; H02M 2001/0032; H02M 2001/0035
See application file for complete search history.

(56) References Cited

U.S. PATENT DOCUMENTS

| 4,754,386 A | 6/1988 | De Weerd |
| 7,349,229 B1 | 3/2008 | Yang |
| RE40,656 E | 3/2009 | Yang et al. |
| 7,505,287 B1 * | 3/2009 | Kesterson ......... H02M 3/33507 363/21.01 |

(Continued)

OTHER PUBLICATIONS

United States Office Action, U.S. Appl. No. 13/937,044, Mar. 4, 2015, 12 pages.

*Primary Examiner* — Timothy J Dole
*Assistant Examiner* — Yusef Ahmed
(74) *Attorney, Agent, or Firm* — Fenwick & West LLP

(57) ABSTRACT

Embodiments described herein describe a power supply configured to provide power to an output load via a power supply transformer. The power supply includes a controller configured to operate in a configuration state and an operating state. During the configuration state, the controller receives a configuration signal from a sense circuit coupled to the controller and selects one of a plurality of operating modes from the configuration signal. During the operating state, the controller controls a switch coupled to the transformer based on the selected operating mode and a sense signal received from the sense circuit representative of the power provided to the output load by the power supply. When the switch is closed, current flows from a power source through the transformer, and when the switch is open, current is prevented from flowing from the power source through the transformer.

18 Claims, 7 Drawing Sheets

(56) References Cited

U.S. PATENT DOCUMENTS

| | | | |
|---|---|---|---|
| 8,279,638 B2 * | 10/2012 | Hsu | H02M 3/33507 323/288 |
| 2006/0056204 A1 | 3/2006 | Yang et al. | |
| 2007/0109816 A1 | 5/2007 | Yang | |
| 2008/0043496 A1 | 2/2008 | Yang | |
| 2008/0067994 A1 | 3/2008 | Kesterson et al. | |
| 2008/0112193 A1 | 5/2008 | Yan et al. | |
| 2008/0123372 A1 | 5/2008 | Yang | |
| 2009/0141520 A1 | 6/2009 | Grande et al. | |
| 2010/0195355 A1 | 8/2010 | Zheng | |
| 2010/0208500 A1 * | 8/2010 | Yan | H02M 3/33523 363/21.12 |
| 2010/0225293 A1 | 9/2010 | Wang et al. | |
| 2010/0244804 A1 | 9/2010 | Zong et al. | |
| 2010/0321956 A1 | 12/2010 | Yeh | |
| 2011/0096573 A1 | 4/2011 | Zhu et al. | |
| 2011/0096574 A1 * | 4/2011 | Huang | H02M 3/33507 363/21.18 |
| 2011/0261596 A1 * | 10/2011 | Zong | H02M 3/33507 363/21.13 |
| 2011/0267850 A1 | 11/2011 | Lin et al. | |
| 2012/0057375 A1 | 3/2012 | Yang et al. | |
| 2012/0170330 A1 | 7/2012 | Yang et al. | |
| 2012/0176819 A1 * | 7/2012 | Gao | H02M 1/36 363/21.12 |
| 2012/0176820 A1 | 7/2012 | Li et al. | |
| 2012/0243269 A1 | 9/2012 | Ren et al. | |
| 2012/0262961 A1 | 10/2012 | Chien et al. | |
| 2013/0107584 A1 * | 5/2013 | Li | H02M 1/08 363/21.12 |
| 2013/0148387 A1 * | 6/2013 | Ren | H02M 1/36 363/21.16 |
| 2013/0215649 A1 | 8/2013 | Huang et al. | |
| 2013/0272036 A1 | 10/2013 | Fang | |
| 2013/0294118 A1 | 11/2013 | So et al. | |
| 2013/0343095 A1 * | 12/2013 | Zhu | H02M 1/4258 363/21.01 |
| 2013/0343097 A1 | 12/2013 | Chen | |
| 2014/0071714 A1 | 3/2014 | Li | |
| 2014/0218976 A1 * | 8/2014 | Luo | H02M 3/33507 363/21.01 |

* cited by examiner

POWER SUPPLY WITH CONFIGURABLE CONTROLLER WITH COMBINATION INPUT/OUTPUT LINE

RELATED APPLICATIONS

This application is a continuation of U.S. application Ser. No. 13/937,044, filed Jul. 8, 2013, now U.S. Pat. No. 9,124,185, which application claims the benefit of U.S. Provisional Application No. 61/670,742, filed Jul. 12, 2012, the content of which are incorporated by reference herein in their entirety.

BACKGROUND

1. Field of Technology

Embodiments described herein relate generally to power conversion, and more specifically, to switching power supplies with feedback control.

2. Description of the Related Arts

The compactness and efficiency of power supplies are an increasing concern to users and manufacturers of electronics. Switching power supplies with pulse width and pulse frequency modulated controllers offer both compactness and efficiency in a number of different topologies. Switching power supply controllers are available in a single integrated circuit chip or package having some number of external connection pins or terminals. As with many other types of integrated circuit chips or packages, limiting the number of external connection terminals of a power supply package is advantageous, allowing both a reduced form factor and over-all cost.

However, as the complexity of electronic devices has grown, so has the complexity of power supply specifications. It is often required for a power supply to operate in a number of different operational modes based on many different factors. Therefore, it is desirable to provide configurability of the power supply to achieve a desired outcome by the system designer. In order to address this requirement, switching power supply controllers have incorporated multiple features and operating modes, which can be enabled and configured by the power supply designer. Example features and operating modes include over-temperature, over-voltage, and over-current protection modes. Multiple modulation modes may also be enabled, which impact output characteristics (such as output ripple and output regulation) as well as input characteristics (such as power factor correction).

Unfortunately, the goal of providing compact and low cost power supply solutions is often at odds with the goal of maximizing power supply functionality and performance. Accordingly, it is desirable to provide a compact and low cost power supply that enables a wide range of programmable features and operating modes.

SUMMARY

Embodiments described herein describe a power supply configured to provide power to an output load via a power supply transformer. The power supply can be, for example, a switching flyback power converter. The power supply is configured to provide power to an output load, such as an LED load. The power supply can provide power to the output load via, for example, a primary winding of a transformer.

The power supply includes a controller configured to operate in a configuration state and an operating state. During the configuration state, the controller receives a configuration signal from a sense circuit via a combination input/output line and selects one of a plurality of operating modes from the configuration signal. The controller is subsequently configured to operate in the selected operating mode. Example operating modes include an over-temperature protection mode, an over-voltage protection mode, an over-current protection mode, and a power factor correction mode.

During the operating state, the controller receives a sense signal from the sense circuit via the combination input/output line representative of the power provided to the output load by the power supply. For example, the sense signal can be reflective of the current or voltage provided to the output load. The controller controls a switch coupled to the transformer based on the sense signal and the selected operating mode. When the switch is closed, current flows from a power source through the transformer, and when the switch is open, current is prevented from flowing from the power source through the transformer.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures (Figs.) and the following description relate to various embodiments by way of illustration only. It should be noted that from the following discussion, alternative embodiments of the structures and methods disclosed herein will be readily recognized as viable alternatives that may be employed without departing from the principles discussed herein.

Reference will now be made in detail to several embodiments, examples of which are illustrated in the accompanying figures. It is noted that wherever practicable similar or like reference numbers may be used in the figures and may indicate similar or like functionality. The figures depict various embodiments for purposes of illustration only. One skilled in the art will readily recognize from the following description that alternative embodiments of the structures and methods illustrated herein may be employed without departing from the principles described herein.

As noted above, the present application is directed towards one or more multiple function switching power supply controller input/output lines. The combination input/output lines allow the power supply controller to enable and configure various power supply features and operating modes without requiring dedicated configuration terminals. Such a design can help maximize controller flexibility and functionality while reducing overall controller cost and size.

Figure 1:
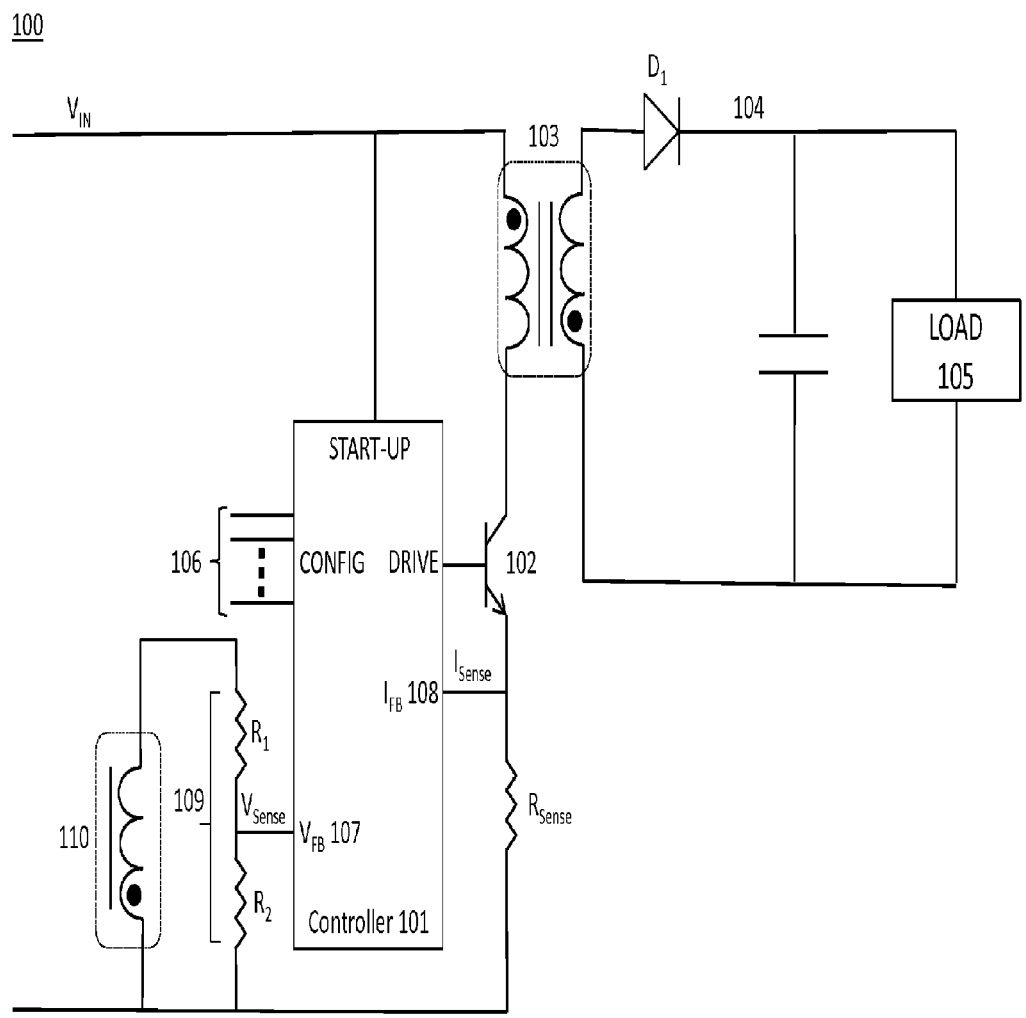
FIG. 1 illustrates a switching flyback power converter, according to one embodiment.

FIG. 1 illustrates a switching flyback power converter 100, according to one embodiment. The power converter 100 includes a controller 101 configured to control the opening and closing of a switch 102. The switch 102 is coupled to the primary winding of a transformer 103, which in turn is coupled to an output 104. The output 104 is coupled to a load 105. The load 105 can be any suitable load configured to receive power from the power converter 100, for instance an LED, a speaker, a microphone, and the like. The controller 101 includes a start-up input, a drive output, a $V_{FB}$ input 107, an $I_{FB}$ input 108, and one or more configuration inputs 106.

In order to maintain the regulation of the output 104, the controller 101 can modulate the opening and closing of the switch 102 via the drive output of the controller 101 based upon feedback signals representing, for example, the output power, voltage, or current of the power converter 100 at the output 104. When the controller 101 closes the switch 102, current flows from the voltage source $V_{IN}$ through the transformer 103 primary winding and the switch 102, causing energy to store in the transformer primary winding. When the controller 101 opens the switch 102, current stops flowing from the voltage source through the transformer 103 and the switch 102, causing the diode $D_1$ to become forward biased and resulting in the transfer of the energy stored in the transformer 103 primary winding to its secondary winding and to the output 104.

The controller 101 is configured to receive a voltage feedback signal $V_{Sense}$ at the voltage feedback input $V_{FB}$ 107. The $V_{FB}$ input 107 is coupled to a voltage divider 109, which includes resistors $R_1$ and $R_2$. The voltage divider is coupled in parallel to an auxiliary winding 110 of the transformer 103. The auxiliary winding 110 is configured to provide a representation of the voltage supplied to the output 104 by the transformer 103. The resistance of resistors $R_1$ and $R_2$ can be selected based on a desired proportional reduction in voltage supplied by the auxiliary winding 110 and received at the $V_{FB}$ input 107. The controller 101 can be configured to adjust the switching of the switch 102 based on the received voltage feedback signal $V_{sense}$.

The controller 101 is also configured to receive a current feedback signal $I_{Sense}$ at the current feedback input $I_{FB}$ 108. The $I_{FB}$ input 108 is coupled to the output of the switch 102 and to a sense resistor $R_{sense}$. The current flowing through the transformer 103, the switch 102, and $R_{Sense}$ when the switch 102 is closed creates a feedback voltage $I_{Sense}$ across $R_{sense}$. The current feedback voltage $I_{Sense}$ is thus representative of the current through the transformer 103, and is received at the $I_{FB}$ input 108. The controller 101 can be configured to adjust the switching of the switch 102 based on the received current feedback voltage $I_{Sense}$.

The controller 101 beneficially allows a power supply designer to configure the power converter 100 to operate in various operating modes and to enable various power converter features. The controller 101 includes configuration input lines 106 that allow a power supply designer to configure the power converter 100 upon starting up or resetting the power converter 100. In some embodiments, the controller 101 can be configured via the configuration input lines 106 when the start-up input of the controller 101 receives a configuration signal. Generally, the number of configuration input lines 106 required for the power converter 100 is dependent on the number of features and operating modes that are supported by the power converter 100.

Figure 2:
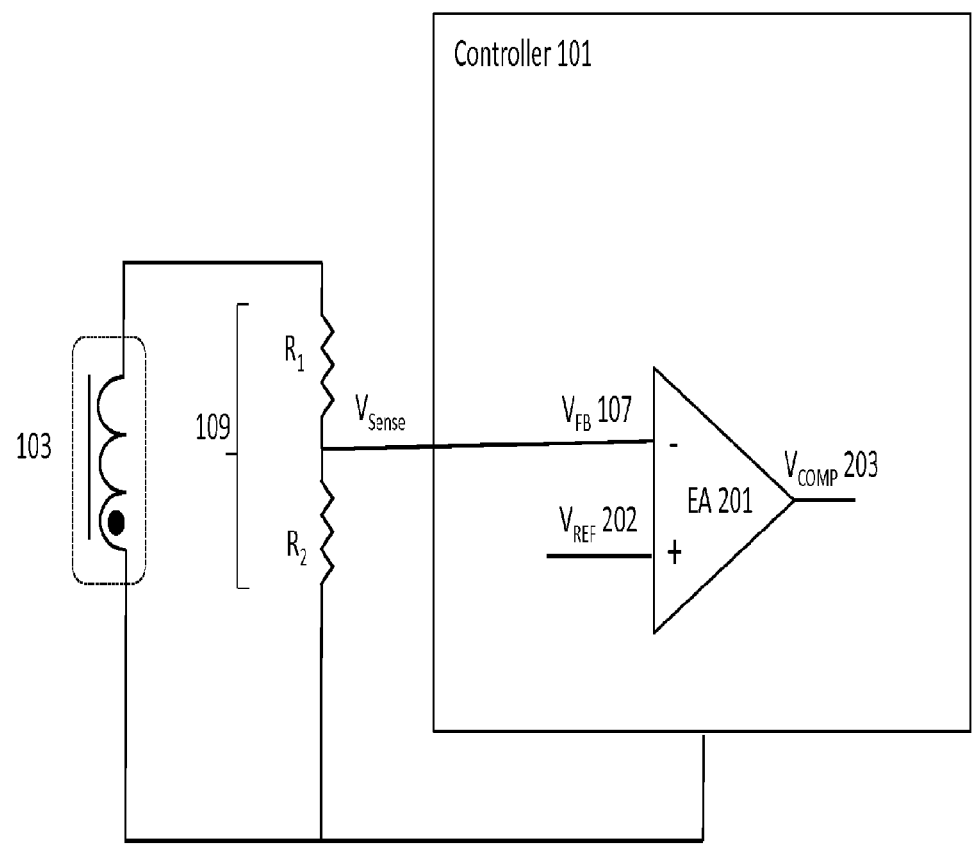
FIG. 2 illustrates the voltage feedback input of the controller of the power converter of FIG. 1, according to one embodiment.

FIG. 2 illustrates the voltage feedback input of the controller 101 of the power converter 100 of FIG. 1, according to one embodiment. The $V_{FB}$ input 107 receives the voltage feedback signal $V_{sense}$, and is coupled to the negative input of an error amplifier ("EA") 201. The EA 201 also receives a reference voltage $V_{REF}$ 202 at the positive input of the amplifier 201. The reference voltage $V_{REF}$ 202 can be selected based on a desired voltage at the output 104. The EA 201 is configured to determine the difference in amplitude between the voltages $V_{Sense}$ and $V_{REF}$ 202, and to output a voltage compensation signal $V_{COMP}$ 203 based on the determined difference in amplitude. In one embodiment, $V_{COMP}$ 203 is a voltage equal to the magnitude of the difference between $V_{Sense}$ and $V_{REF}$ 202. Further, the sign of $V_{COMP}$ 203 can be based on whether $V_{Sense}$ is bigger or smaller than $V_{REF}$ 202. The controller 101 can then adjust the switching of switch 102 based on the signal $V_{COMP}$ 203.

Figure 3:
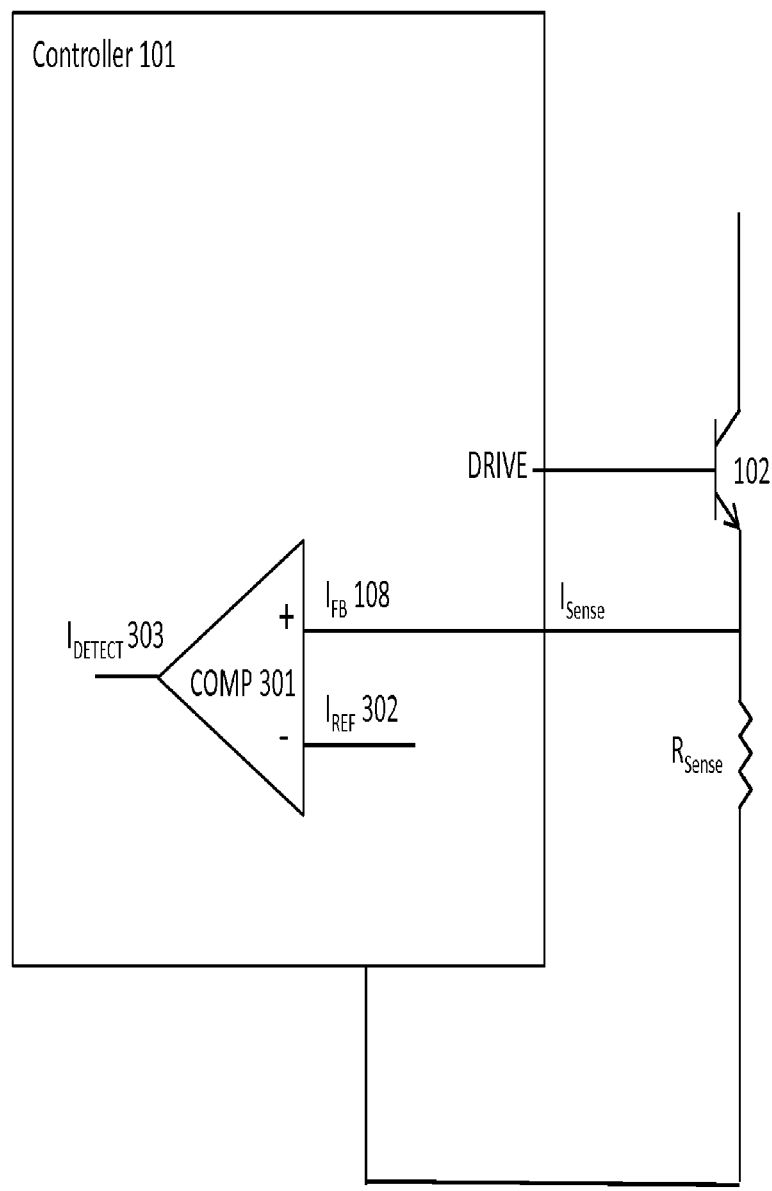
FIG. 3 illustrates the current feedback input of the controller of the power converter of FIG. 1, according to one embodiment.

FIG. 3 illustrates the current feedback input of the controller 101 of the power converter 100 of FIG. 1, according to one embodiment. The $I_{FB}$ input 108 receives the current feedback signal $I_{sense}$, and is coupled to the positive input of a comparator 301. The comparator 301 also receives a reference voltage $I_{REF}$ 302 at the negative input of the comparator 301. The voltage $I_{REF}$ 302 can be selected based on a desired primary peak current through the output 104. For instance, $I_{REF}$ 302 can be equal to a desired primary peak current through the output 104 divided by the resistance of $R_{Sense}$. The comparator 301 compares the voltage $I_{FB}$ 108 and the voltage $I_{REF}$ 302, and outputs the current detection signal $I_{DETECT}$ 303 based on the comparison. The signal $I_{DETECT}$ 303 thus indicates whether or not the current provided to the output 104 has reached the desired primary peak current. Accordingly, the controller 101 can adjust the switching of the switch 102 based on the signal $I_{DETECT}$ 303, for instance to increase the current at the output 104 if the detected current is less than the desired primary peak current.

Figure 4:
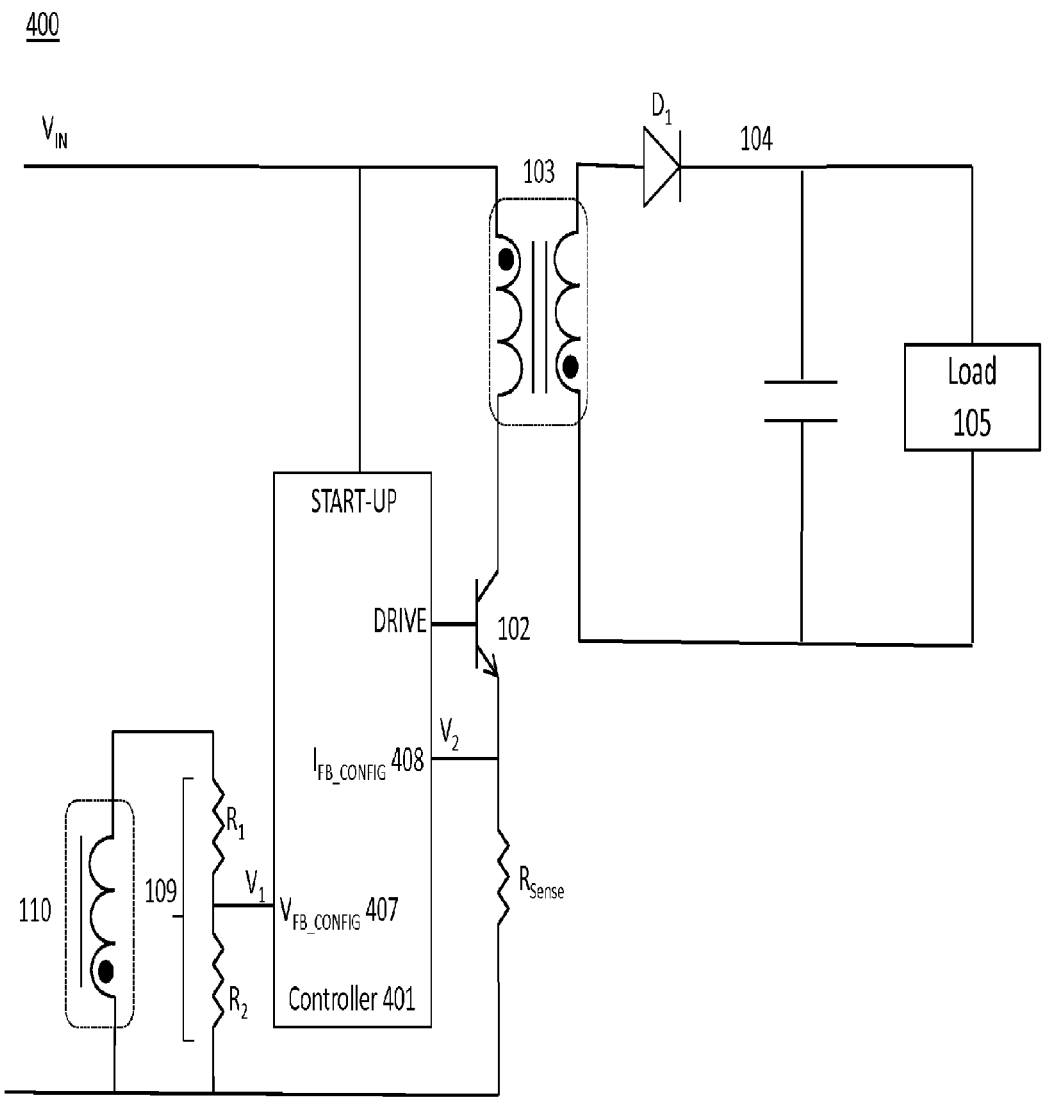
FIG. 4 illustrates a switching flyback power converter, according to one embodiment.

FIG. 4 illustrates a switching flyback power converter 400, according to one embodiment. In the embodiment of FIG. 4, a controller 401 replaces the controller 101 in the power supply of FIG. 1. The controller 401 includes a start-up input, a drive output, a $V_{FB\_CONFIG}$ input 407, and an $I_{FB\_CONFIG}$ input 408. The controller 401 is configured to control the opening and closing of the switch 102 via the drive output and based on voltage and current feedback signals received at the $V_{FB\_CONFIG}$ 407 input and the $I_{FB\_CONFIG}$ 408 input, respectively. It should be noted that although referred to as $V_{FB\_CONFIG}$ input 407 and $I_{FB\_CONFIG}$ input 408 herein for simplicity, both inputs can be combination input/output lines configured to operate as either inputs or outputs based on the state of the controller 401.

The controller 401 can be configured by producing current internally, outputting the current via the $V_{FB\_CONFIG}$ input 407 and/or the $I_{FB\_CONFIG}$ input 408, and detecting the resulting voltage at the $V_{FB\_CONFIG}$ input 407 and/or $I_{FB\_CONFIG}$ input 408. The controller 401 can be configured, for example, when a start-up or reset signal is received at the start-up input of the controller 401, as described below in greater detail. In the embodiment of FIG. 4, the $V_{FB\_CONFIG}$ input 407 is coupled to the voltage divider 109, which in turn is coupled in parallel to the auxiliary winding 110 of the transformer 103. Likewise, the $I_{FB\_CONFIG}$ input 408 is coupled to the switch 102 and the sense resistor $R_{Sense}$.

In the embodiment of FIG. 4, the controller 401 can operate in at least two states: a configuration state, and an operation state. The controller 401 can be placed in a configuration state at start-up, after a reset, or at any other suitable time. In one embodiment, the controller 401 is placed in the configuration state in response to receiving a configuration state signal at the start-up input of the controller 401. The controller 401 can be placed in the operation state after being configured in configuration state, or after receiving an operation state signal, for instance at the start-up input of the controller 401. During the configuration state, the controller 401 disables the drive output, preventing the opening and closing of switch 102. In one embodiment, the switch 102 is held open during the configuration state, and the voltage across the auxiliary winding 110 of the transformer 103 is 0V.

Figure 5:
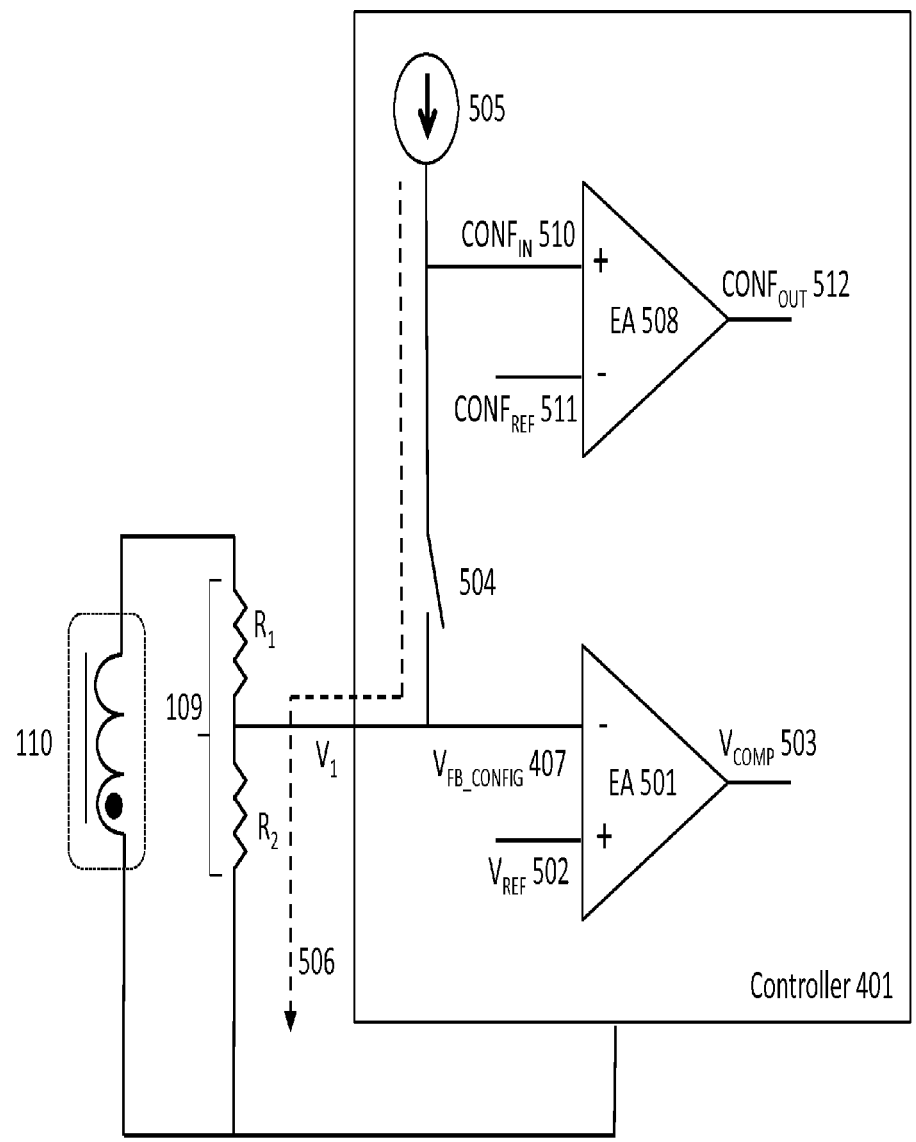
FIG. 5 illustrates the combination voltage feedback input and configuration input of the controller of the power converter of FIG. 4, according to one embodiment.

FIG. 5 illustrates the combination voltage feedback input and configuration input of the controller 401 of the power converter of FIG. 4, according to one embodiment. In the embodiment of FIG. 5, the controller 401 includes a first error amplifier, EA 501, a second error amplifier, EA 508, a switch 504, and a current source 505. The negative input of EA 501 is coupled to the $V_{FB\_CONFIG}$ input 407 of the controller 401, and the positive input of EA 501 is coupled to a reference voltage $V_{REF}$ 502. The positive input of EA 508 is coupled to the output of the current source 505, node $CONF_{IN}$ 510, and the negative input of EA 508 is coupled to the reference voltage $CONF_{REF}$ 511. The switch 504 is coupled to node $CONF_{IN}$ 510 and the $V_{FB\_CONFIG}$ input 407.

During the operation state, the switch 504 is opened, isolating EA 508 from the $V_{FB\_CONFIG}$ input 407. In the operation state, EA 501 receives a sense signal (voltage "$V_1$" in the embodiment of FIG. 5) from the voltage divider 109, compares it to the reference voltage $V_{REF}$ 502, and outputs a voltage compensation signal $W_{COMP}$ 503 based on the comparison. As noted above, the sense signal $V_1$ is reflective of the voltage at the output 104 provided by the power supply 400. The controller 401 can control the switching of the switch 102 based on the output $V_{COMP}$ 503. In some embodiments, during the operation state, the functionality of EA 501 is similar to the functionality of EA 201 of FIG. 2.

In the configuration state, the switch 504 is closed, coupling the current source 505 to the $V_{FB\_CONFIG}$ input 407. When the switch 504 is closed, current 506 flows from the current source 505 out the $V_{FB\_CONFIG}$ 407 input, and through resistors $R_1$ and $R_2$ (in parallel) of the voltage divider 109, resulting in the voltage $V_1$ at the $V_{FB\_CONFIG}$ input 407. EA 508 receives the voltage $V_1$ when the switch 504 is closed, compares it to the reference voltage $CONF_{REF}$ 511, and outputs a configuration output $CONF_{OUT}$ 512 based on the comparison. The reference voltage $CONF_{REF}$ 511 can be selected based on any suitable means, and can be equal to or different from the reference voltage $V_{REF}$ 502.

A user or designer of the power supply 400 can configure the controller 401 in the configuration state by selecting specific values for $R_1$ and $R_2$ to manipulate the voltage $V_1$. By knowing the value of the reference voltage $CONF_{REF}$ 511 and the current 506 provided by the current source 505 in advance, the values of $R_1$ and $R_2$ can be selected such that 1) $V_1$ is greater than $CONF_{REF}$ 511, or 2) $V_1$ is less than $CONF_{REF}$ 511. This allows the controller 401 to be configured in at least two modes: a first mode when $R_1$ and $R_2$ are selected such that $V_1$ is greater than $CONF_{REF}$ 511, and a second mode when $R_1$ and $R_2$ are selected such that $V_1$ is less than $CONF_{REF}$ 511. As noted above, the controller 401 can include multiple configuration modes and features, such as an over-temperature protection mode, an over-voltage protection mode, an over-current protection mode, various modulation modes configured to reduce output ripple or regulate a controller output, a power factor correction mode, and the like. In one embodiment, when $V_1$ is greater than $CONF_{REF}$ 511, a configuration mode (such as an over-voltage protection mode) is enabled, and when $V_1$ is less than $CONF_{REF}$ 511, the configuration mode is disabled. The output $CONF_{OUT}$ 512 indicates whether the received voltage $V_1$ is greater than or less than the reference voltage $CONF_{REF}$ 511, and the controller 401 is subsequently configured based on the value of $CONF_{OUT}$ 512.

In some embodiments, EA 508 can receive multiple reference voltages of varying voltage, and can compare $V_1$ to the multiple reference voltages to determine a desired configuration mode for the controller 401. For instance, if the EA 508 receives four successively higher reference voltages $V_{REF1}$, $V_{REF2}$, $V_{REF3}$, and $V_{REF4}$, EA 508 can output a first value of $CONF_{OUT}$ 512 if $V_1$ is less than $V_{REF1}$, a second value of $CONF_{OUT}$ 512 if $V_1$ is greater than $V_{REF1}$ but less than $V_{REF2}$, and so forth. Such a configuration allows a designer or user of the power supply 400 to select values of $R_1$ and $R_2$ to configure the controller 401 to operate in x+1 modes, where x is the number of reference voltages received by EA 508.

Figure 6:
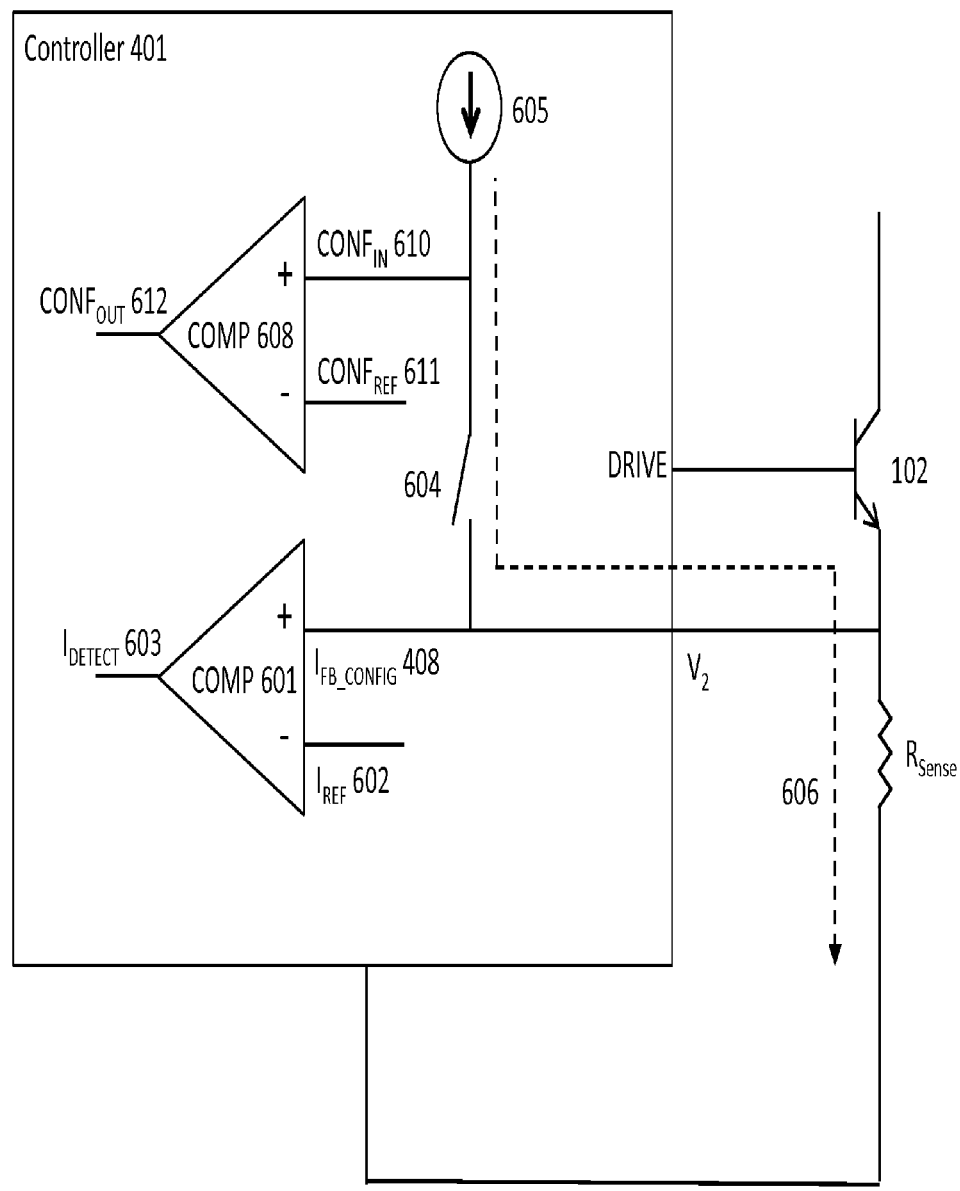
FIG. 6 illustrates the combination current feedback input and configuration input of the controller of the power converter of FIG. 4, according to one embodiment.

FIG. 6 illustrates the combination current feedback input and configuration input of the controller 401 of the power converter of FIG. 4, according to one embodiment. In the embodiment of FIG. 5, the controller 401 includes a first comparator, COMP 601, a second comparator, COMP 608, a switch 604, and a current source 605. The positive input of COMP 601 is coupled to the $I_{FB\_CONFIG}$ input 408 of the controller 401, and the negative input of COMP 601 is coupled to a reference voltage $I_{REF}$ 602. The positive input of COMP 608 is coupled to the output of the current source 605, node $CONF_{IN}$ 610, and the negative input of COMP 608 is coupled to the reference voltage $CONF_{REF}$ 611. The switch 604 is coupled to node $CONF_{IN}$ 610 and the $I_{FB\_CONFIG}$ input 408.

During the operation state, the switch 604 is opened, isolating COMP 608 from the $I_{FB\_CONFIG}$ input 408. In the operation state, COMP 601 receives a sense signal (voltage "$V_2$" in the embodiment of FIG. 6) from the source node of the switch 102. As noted above, the voltage $V_2$ is representative of the current through the transformer 103 (and is equal to the product of the current through the transformer 103 and the resistance of the sense resistor $R_{Sense}$). COMP 601 receives the voltage V2, compares it to the reference voltage $I_{REF}$ 602, and outputs the current detection signal $I_{DETECT}$ 603 based on the comparison. The controller 401 can control the switching of the switch 102 based on the output $I_{DETECT}$ 603. In some embodiments, during the operation state, the functionality of COMP 601 is similar to the functionality of COMP 301 of FIG. 3.

In the configuration state, the switch 604 is closed, coupling the current source 605 to the $I_{FB\_CONFIG}$ input 408.

When the switch 604 is closed, current 606 flows from the current source 605 out the $I_{FB\_CONFIG}$ 408 input, and through the resistor $R_{sense}$, resulting in the voltage $V_2$ at the $I_{FB\_CONFIG}$ input 408. COMP 608 receives the voltage $V_2$ when the switch 604 is closed, compares it to the reference voltage $CONF_{REF}$ 611, and outputs a configuration output $CONF_{OUT}$ 612 based on the comparison. The reference voltage $CONF_{REF}$ 611 can be selected based on any suitable means, and can be equal or difference to the reference voltage $I_{REF}$ 602.

A user or designer of the power supply 400 can configure the controller 401 in the configuration state by selecting a specific value for $R_{Sense}$ to manipulate the voltage $V_2$. By knowing the value of the reference voltage $CONF_{REF}$ 611 and the current 606 provided by the current source 605 in advance, the value of $R_{Sense}$ can be selected such that 1) $V_2$ is greater than $CONF_{REF}$ 611, or 2) $V_2$ is less than $CONF_{REF}$ 611. This allows the controller 401 to be configured in at least two modes: a first mode when $R_{Sense}$ is selected such that $V_2$ is greater than $CONF_{REF}$ 611, and a second mode when $R_{Sense}$ is selected such that $V_2$ is less than $CONF_{REF}$ 611. In one example, when $V_2$ is greater than $CONF_{REF}$ 611, a high power factor correction mode is enabled, and when $V_2$ is less than $CONF_{REF}$ 611, the high power factor correction mode is disabled. The output $CONF_{OUT}$ 612 indicates whether the received voltage $V_2$ is greater than or less than the reference voltage $CONF_{REF}$ 611, and the controller 401 is subsequently configured based on the value of $CONF_{OUT}$ 612. As with EA 508 of FIG. 5, COMP 608 can receive multiple reference voltages, and can output various values of $CONF_{OUT}$ 612 based on the comparison of $V_2$ with the reference voltages for configuring the controller 401 into one or more of multiple operating modes.

In some instances, the value of the sense resistor of FIG. 4, $R_{Sense}$, is generally small in order to allow the controller to detect the primary current through the transformer 403. For instance, $R_{Sense}$ can be less than $10\Omega$. In such instances, the range of $R_{Sense}$ that a designer or user of the power supply 400 can select is very limited. To account for this, an extra resistor $R_{CONFIG}$ can be coupled between the source node of the switch 102 and the input $I_{FB\_CONFIG}$ 408.

Figure 7:
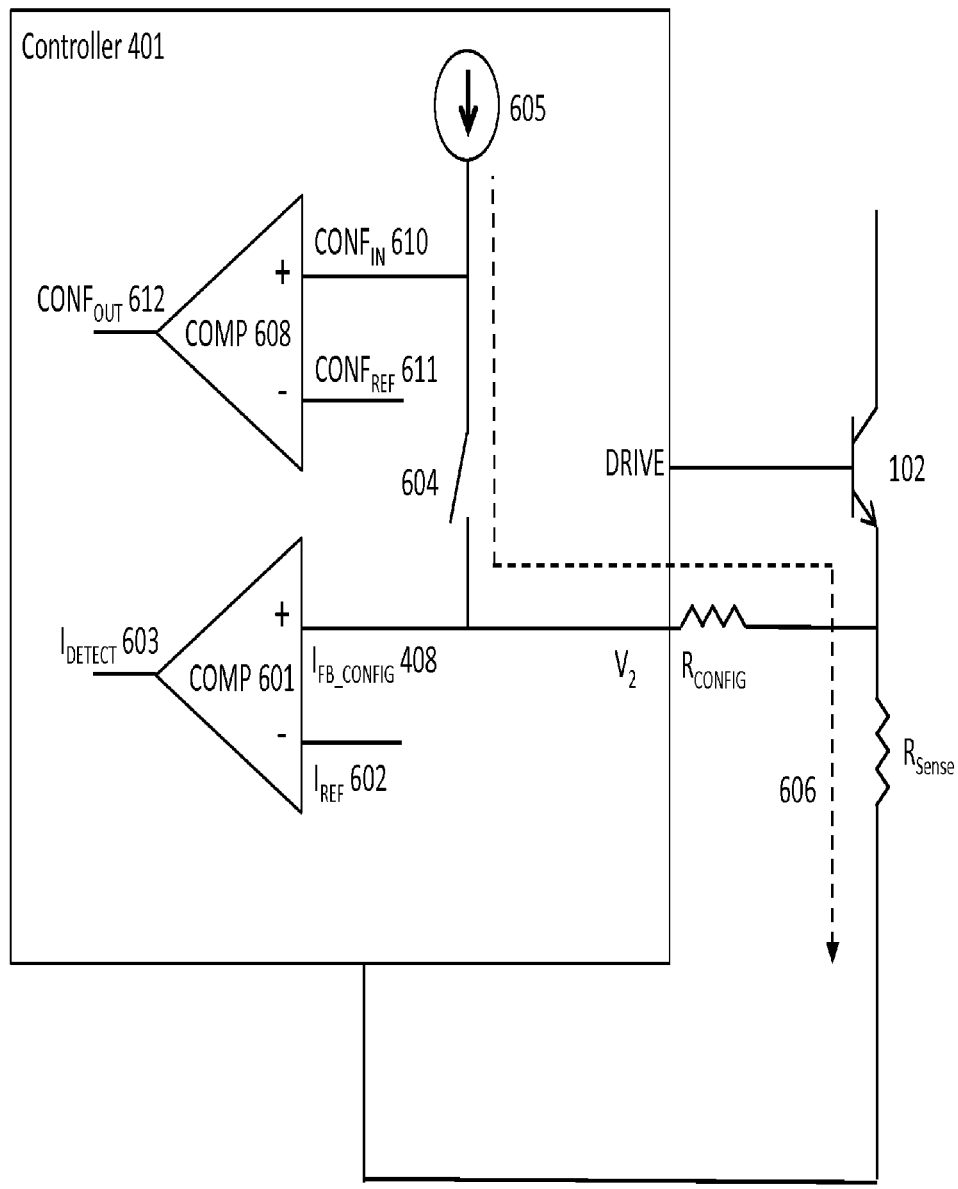
FIG. 7 illustrates the combination current feedback input and configuration input of the controller of the power converter of FIG. 4 with a configuration resistor, according to one embodiment.

FIG. 7 illustrates the combination current feedback input and configuration input of the controller 401 of the power converter of FIG. 4 with a configuration resistor, according to one embodiment. The designer or user of the power supply 400 can select $R_{CONFIG}$ to manipulate the voltage $V_2$ resulting from the current 606 flowing through $R_{CONFIG}$ and $R_{Sense}$ in order to configure the controller 401. For example, $R_{CONFIG}$ can be selected such that $V_2$ is less than $CONF_{REF}$ 611 in order to configure the controller 401 to operate in a first mode, or can be selected such that $V_2$ is greater than $CONF_{REF}$ 611 in order to configure the controller 401 to operate in a second mode. Beneficially, when the controller 401 is in the operation state, the switch 604 is open and no current flows through the resistor $R_{CONFIG}$. Accordingly, the voltage drop across the resistor $R_{CONFIG}$ is 0, and the operation of the controller in the operation state is not affected by the presence of $R_{CONFIG}$.

In addition, the controller 401 can be configured based on a combination of the signals $CONF_{OUT}$ 512 and $CONF_{OUT}$ 612. Such embodiments allow for an even greater number of configuration modes and enabled features. For instance, if the value of $CONF_{OUT}$ 512 allows for the configuration of the controller 401 into 3 distinct modes, and the value of $CONF_{OUT}$ 612 allows for the configuration of the controller 401 into 4 distinct modes, the use of both $CONF_{OUT}$ 512 and $CONF_{OUT}$ 612 allow for the configuration of the controller 401 into 12 distinct modes.

The use of various components within the controller 401 can be shared during the configuration of the controller 401. For instance, the current sources 505 and 605 can be implemented with a single current source, and EA 508 and COMP 608 can be implemented with the same amplifier. In such embodiments, the sharing of components can be implemented by time multiplexing the configuration of the controller 401 to produce the configuration signal $CONF_{OUT}$ 512 in a first time interval and to produce the configuration signal $CONF_{OUT}$ 612 in a second time interval. Such a configuration can beneficially reduce the footprint and cost of the controller 401.

It should be noted that although both error amplifiers and comparators are described in particular embodiments herein, any suitable amplifier, comparator, or circuit configured to produce an output based on the relative values of two inputs may be used interchangeably in various embodiments. In addition, although the controller is described as including two error amplifiers in the embodiment of FIG. 5 and two comparators in the embodiment of FIGS. 6 and 7, any number of error amplifiers or comparators may be implemented within either embodiment. For example, the embodiment of FIG. 5 can include four error amplifiers, three of which are configured to compared a received voltage to varying reference voltages and to output configuration signals based on the comparisons. Finally, although various detected and reference signals are described herein as voltages, the various signals can also be measured in terms of current, power, temperature, or any other suitable metric.

Upon reading this disclosure, those of skill in the art will appreciate still additional alternative designs for a configurable power controller with combination inputs. Thus, while particular embodiments and applications have been illustrated and described, it is to be understood that the embodiments discussed herein are not limited to the precise construction and components disclosed herein and that various modifications, changes and variations which will be apparent to those skilled in the art may be made in the arrangement, operation and details of the method and apparatus disclosed herein without departing from the spirit and scope of the disclosure.

What is claimed is:

1. A power supply comprising:
   a transformer configured to provide power to an output load, the transformer coupled to a power source;
   a switch, coupled to the transformer, configured to allow current to flow from the power source through the transformer when closed and to prevent current from flowing from the power source through the transformer when open;
   a sense circuit configured to provide a sense signal representative of the power provided to the output load, the sense circuit comprising at least one resistor; and
   a controller comprising a current source and a second switch, the second switch configured to allow current to flow from the current source and out a combination input/output line when the controller is in a configuration state and to isolate the current source from the combination input/output line when the controller is in an operating state, the controller configured to:
     responsive to being in the configuration state, output a current through the combination input/output line to the sense circuit and detect a corresponding voltage across the at least one resistor; and responsive to being in the operating state, receive the sense signal via the combination input/output line and control the opening and closing of the switch based on the sense signal and one of a plurality of operating modes selected based on the detected corresponding voltage.

2. The power supply of claim 1, wherein the sense circuit comprises an auxiliary winding of the transformer configured to provide a sense signal representative of a voltage provided to the output load.

3. The power supply of claim 2, wherein the sense circuit further comprises a voltage divider coupled in parallel to the auxiliary winding, the voltage divider comprising two resistors coupled in series, wherein the combination input/output line is coupled between the two resistors.

4. The power supply of claim 1, wherein the sense circuit comprises a sense resistor coupled to the switch and configured to provide a sense signal representative of a current provided to the output load.

5. The power supply of claim 4, wherein the combination input/output line is coupled between the sense resistor and the switch.

6. The power supply of claim 1, wherein the controller further comprises a comparator configured to compare the detected corresponding voltage to a reference voltage and to output a configuration signal based on the comparison when the controller is in the configuration state, wherein one of the plurality of operating modes is selected based on the configuration signal.

7. The power supply of claim 1, wherein the selected operating mode comprises one of: an over-temperature protection mode, an over-voltage protection mode, an over-current protection mode, an over-power protection mode, and an output ripple reduction mode, an output regulation mode, and a power factor correction mode.

8. A power supply controller comprising:
a drive output configured to control the opening and closing of a switch coupled to a transformer, the transformer coupled to a power source and configured to provide power to an output load;
a combination input/output line;
a current source; and
a controller switch;
wherein the controller is configured to receive a configuration signal from a sense circuit comprising at least one resistor via the combination input/output line and to select an operating mode based on the configuration signal when the controller is in a configuration state;
wherein the controller is configured to receive a sense signal from the sense circuit via the combination input/output line and to control the opening and closing of the switch via the drive output based on the sense signal and the selected operating mode when the controller is in an operating state;
wherein the controller switch is configured to allow current to flow from the current source and out the combination input/output line when the controller is in the configuration state, and to isolate the current source from the combination input/output line when the controller is in the operating state.

9. The power supply controller of claim 8, wherein the sense circuit comprises an auxiliary winding of the transformer configured to provide a sense signal representative of a voltage provided to the output load.

10. The power supply controller of claim 9, wherein the sense circuit further comprises a voltage divider coupled in parallel to the auxiliary winding, the voltage divider comprising two resistors coupled in series, wherein the combination input/output line is coupled between the two resistors.

11. The power supply controller of claim 8, wherein the sense circuit comprises a sense resistor coupled to the switch and configured to provide a sense signal representative of a current provided to the output load.

12. The power supply controller of claim 11, wherein the combination input/output line is coupled between the sense resistor and the switch.

13. The power supply controller of claim 8, wherein the controller further comprises a comparator configured to compare the configuration signal to a reference signal, and wherein the controller is configured to select an operating mode based on the comparison.

14. The power supply controller of claim 8, wherein the selected operating mode comprises one of: an over-temperature protection mode, an over-voltage protection mode, an over-current protection mode, an over-power protection mode, and an output ripple reduction mode, an output regulation mode, and a power factor correction mode.

15. A method for operating a power supply controller, comprising:
responsive to the power supply controller being in a configuration state:
receiving, at a combination input/output line, a configuration signal from a sense circuit comprising at least one resistor;
selecting an operating mode based on the received configuration signal; and
closing a first switch such that current flows from a current source of the controller and through the combination input/output line; and
responsive to the power supply controller being in an operating state:
receiving, at the combination input/output line, a sense signal from the sense circuit representative of power provided to an output load by a transformer;
controlling the opening and closing of a second switch coupled to the transformer based on the received sense signal and the selected operating mode, wherein current flows from a power source through the transformer when the second switch is closed, and wherein current does not flow from the power source through the transformer when the second switch is open; and
opening the first switch such that the current source is isolated from the combination input/output line.

16. The method of claim 15, wherein the sense circuit comprises an auxiliary winding of the transformer configured to provide a sense signal representative of a voltage provided to the output load.

17. The method of claim 16, wherein the sense circuit further comprises a voltage divider coupled in parallel to the auxiliary winding, the voltage divider comprising two resistors coupled in series, wherein the combination input/output line is coupled between the two resistors.

18. The method of claim 15, wherein the selected operating mode comprises one of: an over-temperature protection mode, an over-voltage protection mode, an over-current protection mode, an over-power protection mode, and an output ripple reduction mode, an output regulation mode, and a power factor correction mode.

* * * * *